United States Patent
Asano et al.

(10) Patent No.: US 7,297,237 B2
(45) Date of Patent: Nov. 20, 2007

(54) METHOD AND DEVICE FOR SEPARATION AND CONCENTRATION BY EVAPORATION OF MIXTURE WITH SEPARATION FACTOR OF APPROX. 1

(75) Inventors: Koichi Asano, Utsunomiya (JP); Shigeru Hayashida, Tsuchiura (JP); Nobuaki Egoshi, Tsuchiura (JP); Hiroshi Kawakami, Tsuchiura (JP)

(73) Assignees: Koichi Asano, Tochigi-ken (JP); Taiyo Nippon Sanso Corporation, Tokyo (JP)

( * ) Notice: Subject to any disclaimer, the term of this patent is extended or adjusted under 35 U.S.C. 154(b) by 388 days.

(21) Appl. No.: 10/432,164

(22) PCT Filed: Nov. 22, 2001

(86) PCT No.: PCT/JP01/10203

§ 371 (c)(1),
(2), (4) Date: May 20, 2003

(87) PCT Pub. No.: WO02/41977

PCT Pub. Date: May 30, 2002

(65) Prior Publication Data

US 2004/0060810 A1    Apr. 1, 2004

(30) Foreign Application Priority Data

Nov. 22, 2000   (JP)   .............................. 2000-356663

(51) Int. Cl.
*B01D 3/14* (2006.01)
*B01D 59/04* (2006.01)

(52) U.S. Cl. .......................... 203/5; 202/154; 202/198; 202/155; 202/172; 202/173; 203/22; 203/71; 203/100; 423/579; 423/DIG. 7

(58) Field of Classification Search .................... 203/5, 203/71, 25, 21, 22, 100, DIG. 8; 202/154, 202/155, 198, 172, 173; 423/579, DIG. 7
See application file for complete search history.

(56) References Cited

U.S. PATENT DOCUMENTS 217,703  A  *  7/1879  Monsanto .................... 202/155

(Continued)

FOREIGN PATENT DOCUMENTS

EP       0 573 176 A       12/1993

(Continued)

OTHER PUBLICATIONS

Perry et al , "DISTILLATION" , Technique of Organic Chemistry, vol. IV, 1965, pp. 55-58.*

(Continued)

*Primary Examiner*—Virginia Manoharan
(74) *Attorney, Agent, or Firm*—Nixon & Vanderhye P.C.

(57) ABSTRACT

By using a dephlegmator which conducts distillation concurrently with heat exchange within at least one distillation column, or a portion of one distillation column, of a distillation cascade, the quantity of liquid holdup within the distillation apparatus is reduced and the start-up time is shortened. Consequently, the operational costs associated with startup are reduced, and productivity is improved markedly.

14 Claims, 8 Drawing Sheets

U.S. PATENT DOCUMENTS

| | | | |
|---|---|---|---|
| 1,507,108 A * | 9/1924 | Cyphers | 203/81 |
| 1,530,325 A * | 3/1925 | Price | 165/300 |
| 1,619,909 A | 3/1927 | Wilkinson | |
| 2,787,526 A * | 4/1957 | Spevack | 423/580.2 |
| 2,895,803 A * | 7/1959 | Spevack | 423/580.2 |
| 3,969,450 A | 7/1976 | Hengstebeck et al. | |
| 4,237,100 A * | 12/1980 | Delvalle | 423/6 |
| 4,308,107 A * | 12/1981 | Markfort | 203/23 |
| 4,315,802 A | 2/1982 | Tsao et al. | |
| 4,315,902 A | 2/1982 | Dilbert | |
| 4,341,709 A * | 7/1982 | Hofen et al. | 549/272 |
| 4,533,375 A | 8/1985 | Erickson et al. | |
| 4,778,566 A * | 10/1988 | Vinz | 202/153 |
| 5,011,521 A * | 4/1991 | Gottier | 62/639 |
| 5,051,120 A * | 9/1991 | Pahade et al. | 62/625 |
| 5,230,217 A | 7/1993 | Agrawal et al. | |
| 5,419,887 A * | 5/1995 | McCandless et al. | 423/293 |
| 5,626,034 A * | 5/1997 | Manley et al. | 62/623 |
| 5,783,047 A | 7/1998 | Aso et al. | |
| 6,336,344 B1 * | 1/2002 | O'Brien | 62/627 |
| 6,835,287 B1 * | 12/2004 | Kihara et al. | 202/154 |
| 6,899,743 B2 * | 5/2005 | Wijmans et al. | 95/50 |

FOREIGN PATENT DOCUMENTS

| | | |
|---|---|---|
| EP | 0 726 085 A | 8/1996 |
| GB | 2 208 699 A | 4/1989 |
| JP | 58-64101 | 4/1983 |
| JP | 2-63501 | 3/1990 |
| JP | 2001-239101 | 9/2001 |

OTHER PUBLICATIONS

Perry et al, "Disitllation" Technique of Organic Chemistry, vol. IV, 1965, p. 3.*

* cited by examiner

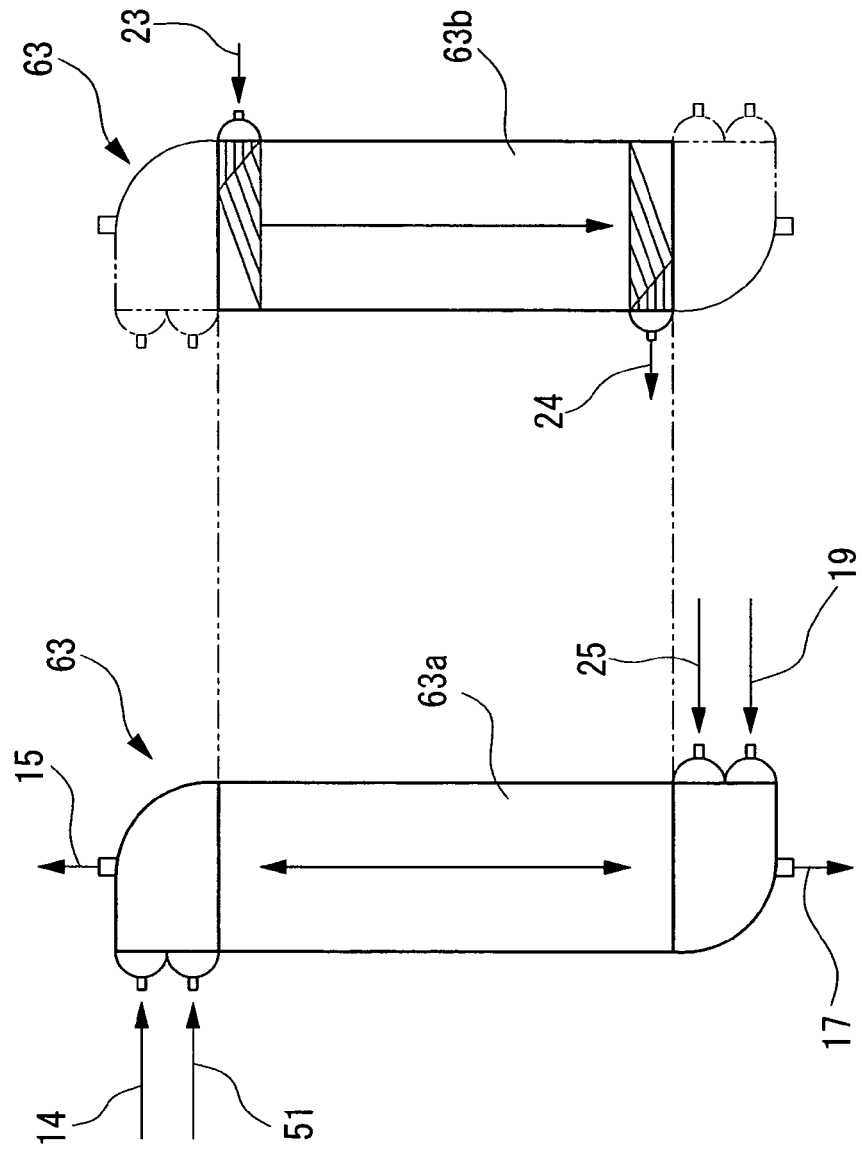

METHOD AND DEVICE FOR SEPARATION AND CONCENTRATION BY EVAPORATION OF MIXTURE WITH SEPARATION FACTOR OF APPROX. 1

This application is the U.S. national phase of international application PCT/JP01/10203 filed 22 Nov. 2001, which designated the US.

TECHNICAL FIELD

The present invention relates to a method and apparatus for separating and enriching each of the components of a mixture with a separation factor close to 1, such as a mixture of structural isomers or isotopes, by low temperature distillation, and relates particularly to a method and apparatus for actively performing heat exchange concurrently with the distillation is integrated within either a portion of, or right through the entirety of, a cascade.

This application is based on a patent application (No. 2000-356663) filed in Japan, the content of which is incorporated herein by reference.

BACKGROUND ART

Methods for the separation and enrichment of mixtures of isotopes or structural isomers typically utilize distillation techniques. Mixtures of isotopes and structural isomers and the like often have separation factors close to 1. For example, the separation factor for xylene isomers (ratio of para/ortho vapor pressures) at a pressure close to atmospheric pressure is approximately 1.2, and the separation factor for the oxygen isotope $^{18}O$ (ratio of $^{16}O^{16}O/^{16}O^{18}O$ vapor pressures) is approximately 1.01.

In the case of this type of mixture, a packed column system is normally used for the distillation column. However, in the case of a distillation of a mixture with a separation factor extremely close to 1, in order to ensure the necessary vapor liquid contact region required for separation, either the number of distillation column must be increased, or the total length of a single column must be made as long as possible. In other words, in a distillation separation method, because the vapor liquid contact section of the distilling column lengthens, the quantity of liquid holdup of the targeted components within the distilling column increases. Consequently, in this type of distillation apparatus, the start-up time (the time from the commencement of operations until a product is obtained) will be long. (Normally, vapors have much smaller densities than liquids, meaning vapor holdup can be ignored.)

For example, Dostrovsky et al. have reported that the start-up time for a distillation apparatus for separating the oxygen isotope $^{18}O$ using water is at least 480 days (I. Dostrovsky and M. Epstein: "The Production of Stable Isotopes of Oxygen", Stable Isotopes pp. 693-702 (1982) Elsevier Scientific Publishing Company, Amsterdam).

In this type of distillation apparatus, reducing the quantity of liquid holdup within the distillation apparatus can be a direct method of shortening the start-up time. Accordingly, in conventional distillation separation of isotopes and the like, actions such as replacing random packing with structured packing, or reducing dead volume from the reboiler without impeding the liquid flow, have been performed. Examples include installing embedded structures within the liquid accumulated in the reboiler which do not impede the liquid flow, and a method without liquid pumps which connects a plurality of distillation columns in a cascade arrangement (an example of this method is disclosed in Unpublished Japanese Patent Application, No. Hei 11-290259: "Apparatus, method for enrichment of the heavy isotopes of oxygen and production method for heavy oxygen water").

A schematic diagram of a conventional example of a method of separating and enriching a mixture with a separation factor close to 1, such as the separation of isotopes or structural isomers, is shown in FIG. 7. Using oxygen isotopes as an example of a mixture with a separation factor close to 1, FIG. 7 shows the flow diagram for enriching the low volatile oxygen isotopes $^{17}O$ and $^{18}O$ through oxygen distillation. In this conventional example, in order to allow any start-up time reduction effects to be observed clearly, the case of a distillation apparatus cascade with 10 distillation columns is investigated.

A "cascade" refers to connecting distillation columns so that the enriched product by the one distillation column is further enriched by the next column, and then even further enriched by one after another, and the overall combination of distillation columns constructed in this manner is termed a "cascade process".

In FIG. 7, the feed is ultra high purity oxygen (flow rate 2.816 mol/s) and incorporates the oxygen isotopes in their natural abundance ratios (refer to Table 1 and Table 2).

TABLE 1

| Element | Abundance ratio |
|---|---|
| $^{16}O$ | 0.99759 |
| $^{17}O$ | 0.00037 |
| $^{18}O$ | 0.00204 |
| Total | 1.00000 |

TABLE 2

| Mass number | Oxygen molecule | Abundance ratio |
|---|---|---|
| 32 | $^{16}O^{16}O$ | 0.99519 |
| 33 | $^{16}O^{17}O$ | 0.00074 |
| 34 | $^{16}O^{18}O$ | 0.00407 |
| 34 | $^{17}O^{17}O$ | 1.37E−07 |
| 35 | $^{17}O^{18}O$ | 1.51E−06 |
| 36 | $^{18}O^{18}O$ | 4.16E−06 |
| Total | | 1.00000 |

Each distillation column filled with a structured packing with a specific surface area of 500 $m^2/m^3$ and a packing height of 45 m, and is operated at an overhead pressure of 1.2 bar (absolute pressure) and a superficial vapor load Fs (F-factor) of approximately 1.6. The 10 distillation columns are connected in a cascade, and first, ultra high purity oxygen is introduced as the feed into a first column 8 from a pipeline 1. The isotopes of the introduced ultra high purity oxygen are separated into a low volatile component and a high volatile component by distillation, and the high volatile component exits from the top of the first column 8 as an exhaust gas, and passes through a pipeline 2, and then through a condenser 9 and out of a pipeline 3. A portion of this high volatile component is returned to the upper section of the first column 8 via a pipeline 4.

In contrast, at the bottom of the first column 8, a bottom liquid with an enriched low volatile component passes into a pipeline 5, and following vaporization in a reboiler 10, a portion is fed through a pipeline 7 into the upper section of a second column 11, while the remainder passes through a pipeline 6, which is split from the pipeline 7, and introduced into the first column 8, where it becomes the ascending vapor of the first column 8. The low volatile components fed into the upper section of the second column 11 via the pipeline 7 undergoes further enrichment of the low volatile component in the second column 11.

The low volatile component enriched in the second column 11 is fed to a condenser 12, and the high volatile component is fed into a reboiler 13.

By repeating this process, eventually the enriched low volatile component is fed into the upper section of a tenth column 34 from a pipeline 30, and the further enriched low volatile component pulls out the bottom of the tenth column 34 via a pipeline 31, and the enriched low volatile vapor produced by vaporization in a reboiler 36, passes through a pipeline 35, and is delivered out of a pipeline 33 as a final product. The ascending vapor required in the tenth column 34 is supplied to the lower section of the tenth column 34 from a pipeline 32 split off from the pipeline 35. This cascade system is described in detail in Unpublished Japanese Patent Application, No. Hei 11-290259, and in comparison with the cases in which liquid pumps are used, is able to reduce the quantity of liquid holdup and the amount of heat-inleak.

The heat-exchange-fluid used in the heat exchangers (condenser and reboiler) attached to each column may utilize any of nitrogen, oxygen, air, or the exhaust gas from an air separation unit, and usually a circulation (not shown in the figure) is formed connecting the condenser and the reboiler, enabling continuous operation. The concentration distributions within each column in this conventional example are shown in FIG. 8. In FIG. 8, the packing height shown on the horizontal axis is defined so that the top of the first column 8 is set as a packing height of zero, and the packing heights of the subsequent columns are then added on, so that the bottom of the tenth column 34 corresponds with a packing height of 450 m. A portion of the vapor from the reboiler 36 of the tenth column 34 is produced via the pipeline 33 as the product (flow rate 0.0352 mol/s). As a result of the ten column cascade, $^{16}O^{17}O$ is enriched from 0.074% to 2%, and $^{16}O^{18}O$ is enriched from 0.407% to 25%. The recovery rates of $^{17}O$ and $^{18}O$ are 34.3% and 76.6% respectively. The production rate, when converted to water, amounts to 40 tones of $^{17}O$ water ($^{17}O$ 1 atom %) per year, which represents an industrial scale production for the isotope.

However, in terms of the distillation method and apparatus, dephlegmators (combined heat exchange and distillation apparatuses) are already known. The main purpose of using these dephlegmators is to energy-saving and enable a more compact apparatus. Examples of energy-saving are disclosed in Unexamined Japanese Patent Application, First Publication No. Hei 8-66601 and Unexamined Japanese Patent Application, First Publication No. Hei 8-131704 (benzene-toluene, HiDiC). Furthermore, an example of a more compact apparatus is disclosed in Unexamined Japanese Patent Application, First Publication No. Hei 11-153383 (Method and device for producing nitrogen). In addition, an example targeting both energy-saving and a more compact apparatus is disclosed in U.S. Pat. No. 5,921,108 (Reflux condenser cryogenic rectification system for producing lower purity oxygen).

However, no evidence has been provided as to whether or not the liquid holdup within a distillation apparatus can be reduced using these types of dephlegmators.

As described above, when a distillation method is used to separate and enrich a mixture with a separation factor close to 1, the problem of increased liquid holdup within the distillation apparatus arises.

DISCLOSURE OF INVENTION

The present invention takes the above factors into consideration, with an object of providing a separation and enrichment method and apparatus to minimize liquid holdup.

The present inventors solve the problem of increasing liquid holdup within the distillation apparatus inherent in conventional technology by applying a dephlegmator to the conventional separation and enrichment method in which mixtures with a separation factor close to 1 are separated and enriched by distillation, and they thereby achieve a shortening of the start-up time. The present invention provides a separation and enrichment method which can reduce the operational costs and can markedly improve productivity.

In other words, a separation and enrichment method of the present invention is a method of separating and enriching a mixture with a separation factor close to 1 using a distillation cascade, wherein a dephlegmation, in which distillation is conducted concurrently with heat exchange between the mixture and a heat-exchange-fluid, is conducted within at least one distillation section of the distillation cascade.

Another separation and enrichment method of the present invention is a method of separating and enriching a mixture with a separation factor close to 1 using a distillation cascade, wherein at least one distillation section of the distillation cascade is divided into an upper and a lower portion at an arbitrary position, a bottom liquid of the upper portion flowing out from the bottom end of the upper portion is fed into the top end of a dephlegmation section, the bottom liquid is separated into a high volatile component and a low volatile component in the dephlegmation section, the high volatile component is fed into the bottom end of the upper portion as a vapor, and the low volatile component is fed into the top end of the lower portion as a liquid enriched component.

In addition, another separation and enrichment method of the present invention is a method of separating and enriching a mixture with a separation factor close to 1 using a distillation cascade, wherein a bottom liquid of at least one distillation section of the distillation cascade is supplied to a dephlegmation section, and a dephlegmation, in which distillation of the mixture is conducted concurrently with heat exchange between the mixture and a heat-exchange-fluid, is conducted in the dephlegmation section.

In the dephlegmation section mentioned above, the quantity of heat applied to generate the ascending vapor required for ensuring adequate vapor-liquid contact is preferably the combined total of the quantity of heat applied to the dephlegmation section, and the quantity of heat applied to the reboiler attached to the distillation section.

Furthermore, the entire quantity of heat that should be applied to generate the ascending vapor required in the dephlegmation section is preferably applied to the dephlegmation section.

In the separation and enrichment method of the present invention, the heat exchange in the dephlegmation section can be performed by using at least two fluids of different pressure as the heating side fluid supplied to the heat exchange.

The separation and enrichment method of the present invention can utilize heat-inleak as the heat source for applying to the dephlegmation section to achieve the necessary heat exchange.

A separation and enrichment apparatus of the present invention is an apparatus for separating and enriching a mixture with a separation factor close to 1 using a distillation cascade, wherein at least one distillation column is a dephlegmator which conducts distillation concurrently with heat exchange between the mixture and a heat-exchange-fluid.

Another separation and enrichment apparatus of the present invention is an apparatus for separating and enriching a mixture with a separation factor close to 1 using a distillation cascade, a dephlegmator which conducts distillation concurrently with heat exchange between the mixture and a heat-exchange-fluid is provided within at least one distillation column.

In the present invention, a path can also be provided for enabling direct supply of the enriched component from a lower section of a distillation column to an upper section of the next distillation column in the distillation cascade.

The aforementioned dephlegmator can utilize a construction in which the fluid passage through which the heat-exchange-fluid flows is divided into at least two sections in lengthwise along said passage.

The aforementioned distillation column can utilize a construction comprising a reboiler passage for sending the bottom liquid from the distillation column to the reboiler, a shut-off valve provided in this passage, a reboiler bypass passage for supplying the bottom liquid to the next distillation column within the distillation cascade without passing through the reboiler, and a shut-off valve provided in this passage.

BRIEF DESCRIPTION OF THE DRAWINGS

FIG. 5 is a simplified structural diagram showing a fifth embodiment of the present invention.

BEST MODE FOR CARRYING OUT THE INVENTION

Figure 1:
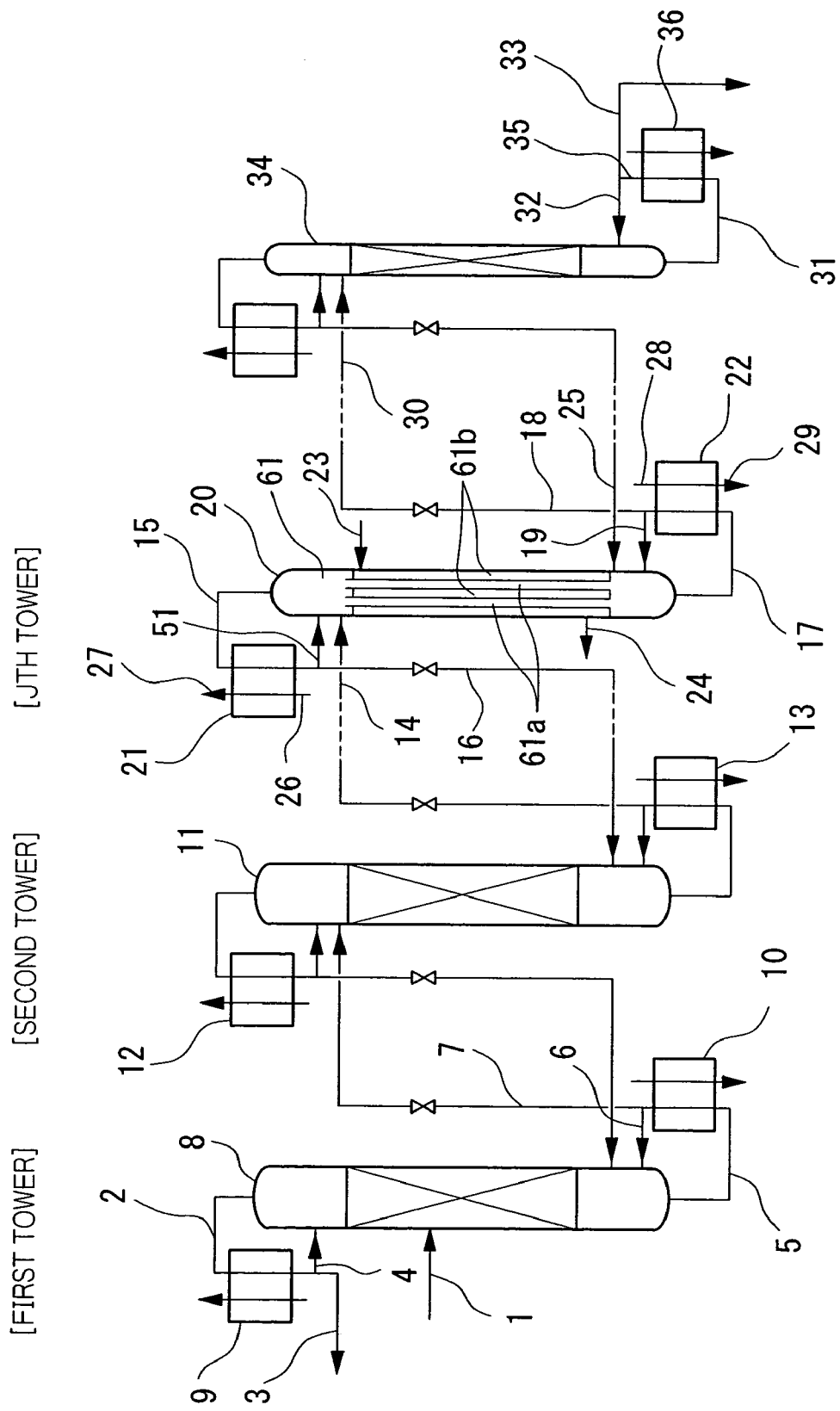
FIG. 1 is a schematic diagram showing a first embodiment of the present invention.

FIG. 1 shows a first embodiment of a separation and enrichment apparatus of the present invention. This separation and enrichment apparatus represents an example in which a dephlegmator is used within one column of a plurality of columns which form a cascade.

The first embodiment is basically the same system as the conventional example, and the same devices and pipelines are labeled with the same reference symbols, and description of those areas which are identical with the conventional example is omitted.

The first embodiment is an example in which a dephlegmator is used in a Jth column 20 shown in FIG. 1.

The dephlegmator 61 which is shown comprises a distillation passage 61a through which the mixture flows, and a fluid passage 61b through which a heat-exchange-fluid flows, and the mixture and the heat-exchange-fluid which flow through these passages 61a, 61b can undergo mutual heat exchange through the passage walls.

In the Jth column 20, the ascending vapor which flows out from the top of the column into a pipeline 15 is liquefied by a condenser 21, and then a portion of the liquid is returned to the Jth column 20 via a pipeline 51, and the remainder passes through a pipeline 16 and is returned to the (J−1)th column (the distillation column positioned immediately prior to the Jth column 20 in the plurality of columns which form the cascade).

The condensate introduced into the Jth column from the pipeline 51 is distributed by a liquid distributor (not shown in the figure) provided inside the dephlegmator 61, and then flows down through the distillation passage 61a (including a pipeline), undergoes vapor liquid contact with the ascending vapor, while concurrently undergoing heat exchange with a heat-exchange-fluid such as medium pressure nitrogen and the surfaces of the passage wall, and partially vaporizes.

In the lower section of the Jth column 20, the quantity of the bottom liquid has reduced, and the remaining liquid flows from the bottom of the Jth column 20, through the pipeline 17 and into a reboiler 22 where it vaporizes, and a portion of the vaporized vapor then passes through a pipeline 19 and is returned to the lower section of the Jth column 20 as the ascending vapor, and the remainder passes through a pipeline 18 and is fed into the upper section of (J+1)th column, which represents the next column in the cascade.

Furthermore, a vapor is fed from the (J−1)th column through a pipeline 14 and into a position near the top of the Jth column 20. Moreover, a liquid (or a vapor-liquid two phase stream) is fed from the (J+1)th column through a pipeline 25 and into the bottom of the Jth column 20.

The medium pressure nitrogen vapor supplied to the dephlegmator 61 as the heat-exchange-fluid is introduced from a pipeline 23 into the fluid passage 61b in the upper section of the Jth column 20, and undergoes heat exchange with the bottom liquid (mixture) flowing down the distillation passage 61a via the passage walls, and as a result, condenses and passes out a pipeline 24 at the bottom of the Jth column 20 as a liquid.

Furthermore, medium pressure nitrogen is also used as the heat-exchange-fluid in the condenser 21 and the reboiler 22, and nitrogen which passes through the pipeline 28 into the reboiler 22 and is liquefied, is fed out through a pipeline 29, and is then pumped, together with medium pressure liquid nitrogen from the pipeline 24, by a liquid pump (not shown in the figure) through a pipeline 26 and into the condenser 21. In the condenser 21, the liquid nitrogen vaporizes as a result of heat exchange with the ascending vapor of the Jth column 20, and passes out of the condenser 21 via a pipeline 27, where it is compressed by a compressor or the like (not shown in the figure), before being recycled and fed into either the medium pressure nitrogen vapor supply pipeline 23 of the Jth column 20, or the pipeline 28 leading to the reboiler 22. Examples of the compression method include methods using a low temperature compressor or methods in which the vapor is passed through a heat exchanger and heat is recovered and compression is performed at normal temperature.

In FIG. 1, by controlling the amount of heat-inleak, for example by altering the thermal insulation material for the Jth column 20 and using a material with a lower thermal insulation performance than normal to increase the amount of heat-inleak, that heat can be used for partial vaporization.

Figure 2:
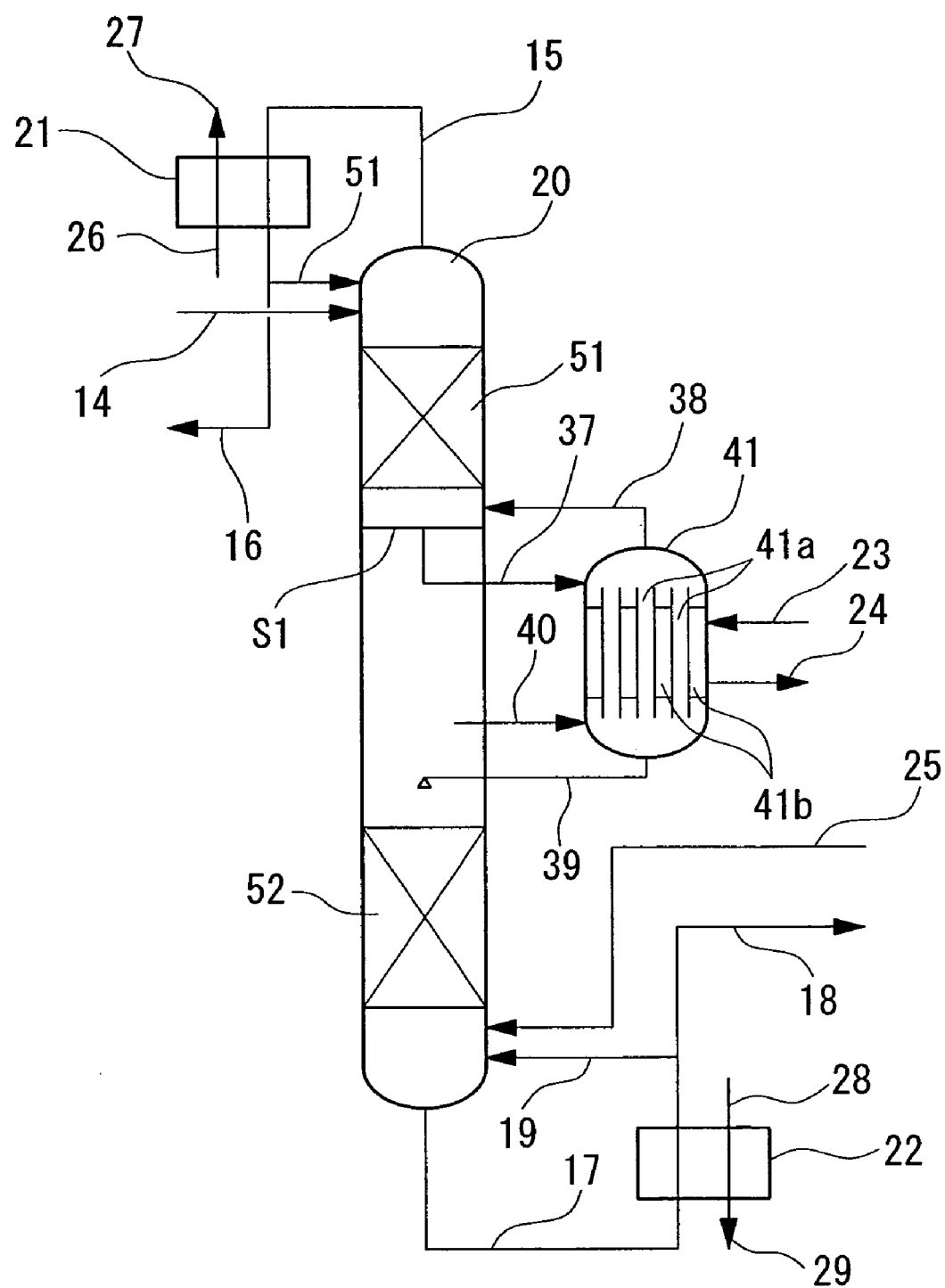
FIG. 2 is a schematic diagram showing a second embodiment of the present invention.

A second embodiment of the present invention is shown in FIG. 2. The second embodiment is basically the same system as the first embodiment, and the same devices and pipelines are labeled with the same reference symbols, and description of those areas which are identical with the conventional example is omitted.

The second embodiment uses a construction in which for a single arbitrary distillation column of the first embodiment, a dephlegmator is attached at an arbitrary position on the packed column.

To describe FIG. 2, if the single column is termed the Jth column 20 for the purposes of this description, then a partition S1 which divides the column into an upper and a lower sections is inserted in the middle of the Jth column 20, and the bottom liquid of an upper filled section 51 of the distillation column, positioned above the partition S1, passes out the bottom end through a pipeline 37 and enters the top end of a dephlegmator 41, where it is separated into a high volatile component and a low volatile component inside a distillation passage 41a. The high volatile component is then fed, via a pipeline 38, into the bottom of the upper filled section 51 of the distillation column as a vapor, and the low volatile component is fed, via a pipeline 39, into the top end of a lower filled section 52 of the distillation column, positioned below the partition S1, as a liquid enriched component.

The ascending vapor in the lower filled section 52 of the distillation column passes through a pipeline 40 and enters the lower section of the dephlegmator 41. Furthermore, the ascending vapor in the lower filled section 52 of the distillation column can also be fed, as is, into the lower section of the upper filled section 51 of the distillation column.

In addition, the heat-exchange-fluid supplied to the dephlegmator 41 is introduced in a vapor state from a pipeline 23 into a fluid passage 41b, and is then liquefied and passes out through a pipeline 24. This construction is identical with the first embodiment.

Here, an example was shown in which the dephlegmator 41 and the Jth column 20 were provided separately, but a construction in which the dephlegmator is incorporated within a single distillation column is also possible.

Figure 3:
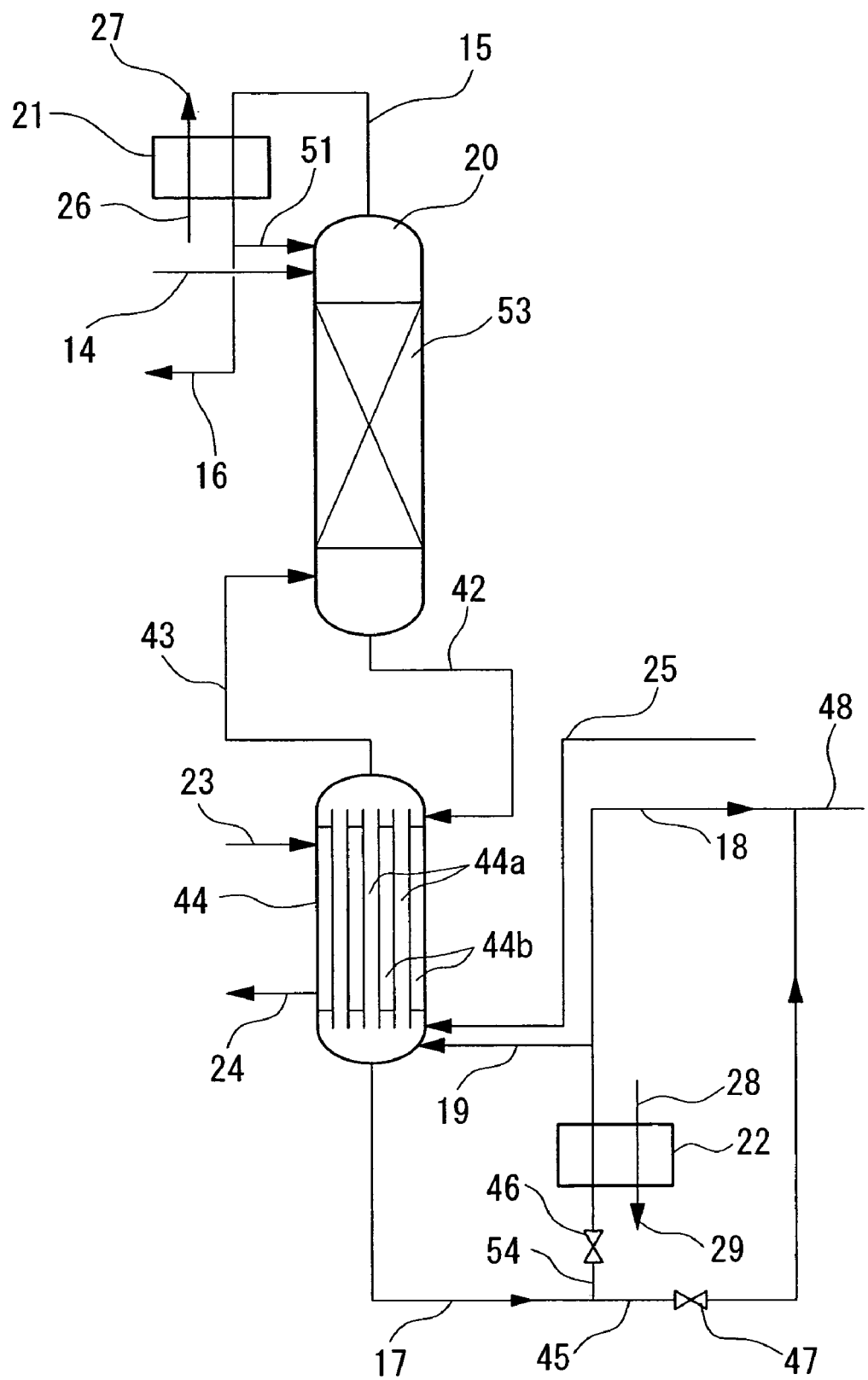
FIG. 3 is a schematic diagram showing a third embodiment of the present invention.

Next, a third embodiment of the present invention is shown in FIG. 3. The third embodiment is basically the same system as the first embodiment, and the same devices and pipelines are labeled with the same reference symbols, and description of those areas which are identical with the conventional example is omitted. The third embodiment uses a construction in which for a single distillation column shown in the first embodiment, a packed column is provided in the upper section and a dephlegmator is provided in the lower section.

To describe FIG. 3, if the single column is termed the Jth column 20 for the purposes of this description, then in the separation and enrichment apparatus shown, a dephlegmator 44 is provided beneath the Jth column 20, and this dephlegmator 44 is connected to the bottom end of the Jth column 20 via pipelines 42 and 43.

In this separation and enrichment apparatus, the bottom liquid of the packed section 53 of the distillation column passes out the bottom of the Jth column 20 via the pipeline 42, and then enters the top end of the dephlegmator 44 where it is separated into a high volatile component and a low volatile component inside a distillation passage 44a. The high volatile component is then fed, via a pipeline 43, into the bottom of the filled section 53 of the distillation column as a vapor, and the low volatile component passes from the bottom of the dephlegmator 44, through a pipeline 17 and into a reboiler 22.

A portion of the vaporized and enriched component from the reboiler 22 passes through a pipeline 19, enters the lower section of the dephlegmator 44, and becomes an ascending vapor, and the remainder passes through a pipeline 18 and is fed into the next column within the cascade.

In addition, the heat-exchange-fluid supplied to the dephlegmator 44 is introduced in a vapor state from a pipeline 23 into a fluid passage 44b, and is then liquefied and passes out through a pipeline 24. This construction is identical with the first embodiment.

The total of the quantity of heat supplied to the dephlegmator 44 and the quantity of heat supplied to the reboiler 22 is a sufficient quantity of heat for generating the ascending vapor required in the distillation column 20. Furthermore, the quantity of heat-exchange-fluid introduced from the pipeline 23 may also be increased, so that the required reboil quantity for the distillation column 20 can be satisfied solely from the quantity of heat supplied to the dephlegmator 44. In such a case, the reboiler can be omitted.

Furthermore, a separation and enrichment apparatus of the embodiment shown also comprises a reboiler passage 54 for sending the bottom liquid which has passed from the bottom of the dephlegmator 44 and through the pipeline 17, to the reboiler 22, a shut-off valve 46 provided in this passage 54, a reboiler bypass passage 45 for supplying the bottom liquid from the pipeline 17 to the next column without passing through the reboiler 22, and a shut-off valve 47 provided in this passage 45.

As a result, when the reboiler 22 is used in this apparatus, by opening the shut-off valve 46 and closing the shut-off valve 47, the bottom liquid flows through the pipelines 54, 18 and 48, through the reboiler 22, and is then sent to the next column.

In addition, when the reboiler 22 is not to be used, by closing the shut-off valve 46 and opening the shut-off valve 47, the bottom liquid passes through the pipelines 45 and 48, and can be supplied directly to the next column without passing through the reboiler 22.

In this manner, by adopting a construction in which the reboiler can be switched from an in-use state to an unused state, the apparatus can be operated with a shortened start-up time.

In addition, the switching operation for the shut-off valves 46, 47 can also be performed automatically.

Furthermore, in this separation and enrichment apparatus of the present invention, even when the apparatus is operated without using the reboiler, it is still preferable that the boiler is provided. By providing the reboiler, enriched liquid can be stored when operation of the apparatus is halted, and in addition, the reboiler can be used only during startup, to temporarily increase the reboil quantity, thereby enabling the start-up time to be shortened.

Here, an example was shown in which the dephlegmator and the Jth column were provided separately, but a construction in which the dephlegmator is incorporated within a single distillation column, that is, in the lower section of the Jth column 20, is also possible.

Figure 4:
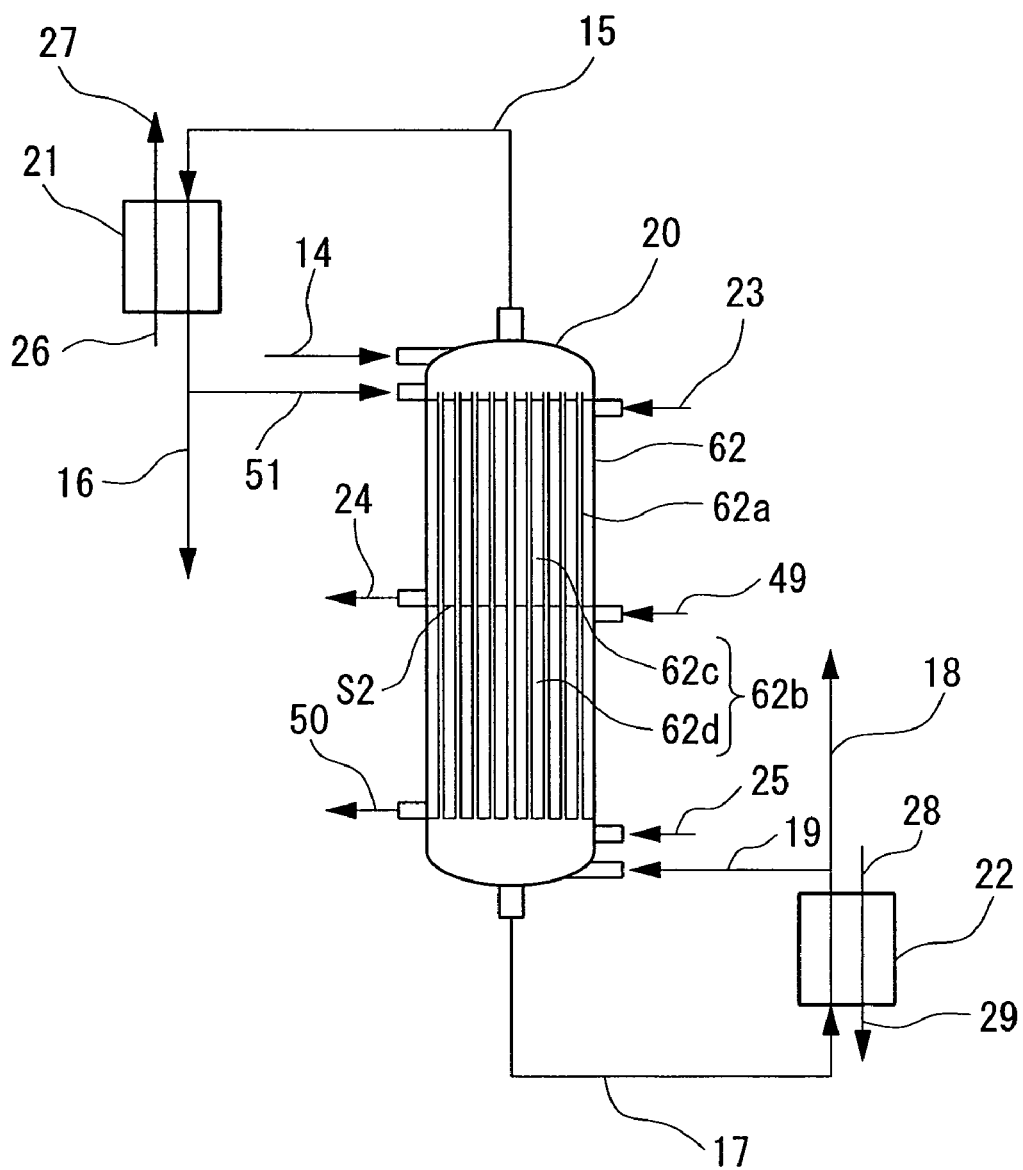
FIG. 4 is a schematic diagram showing a fourth embodiment of the present invention.

Next, a fourth embodiment of the present invention is shown in FIG. 4. The fourth embodiment is basically the same system as the first embodiment, and the same devices and pipelines are labeled with the same reference symbols, and description of those areas which are identical with the conventional example is omitted.

The fourth embodiment represents a further refinement of the first embodiment, wherein in the dephlegmator shown in FIG. 1, the fluid passage is divided into at least two sections from one end of the distillation passage through to the other end.

In a dephlegmator 62 shown in FIG. 4, a fluid passage 62 is divided into two sections by a partition S2, that is, an upper fluid passage 62c and a lower fluid passage 62d.

In this dephlegmator 62, by introducing heat-exchange-fluids of different pressures into the upper and lower fluid passages 62c and 62d, partial vaporization can be performed more gently in the upper section of the column, whereas the partial vaporization in the lower section of the column can be enhanced.

These two types of heat-exchange-fluids can utilize, for example, medium pressure nitrogen vapor and high pressure nitrogen vapor.

In such a case, in the upper section of the dephlegmator 62 shown in FIG. 4, a medium pressure nitrogen vapor flows through the pipeline 23 as a heat-exchange-fluid and enters the upper fluid passage 62c from the upper section of the dephlegmator 62, and having been liquefied inside the upper fluid passage 62c, exits from the central section of the dephlegmator 62 via the pipeline 24.

In addition, in the lower section of the dephlegmator 62 shown in FIG. 4, a high pressure nitrogen vapor flows through a pipeline 49 and enters the lower fluid passage 62d from the central section of the dephlegmator 62, and having been liquefied inside the lower fluid passage 62d, exits from the lower section of the dephlegmator 62 via a pipeline 50.

In the dephlegmator 62 shown in the figure, by appropriate setting of the pressures of the heat-exchange-fluids within the upper and lower fluid passages 62c and 62d, the heat exchange temperature difference within the lower section of the Jth column 20 can be increased, enabling the quantity of partial vaporization within the lower section to be increased, and the height of the column to be decreased.

Examples of methods for generating the high pressure nitrogen vapor include methods in which a separate compressor from the aforementioned compressor is prepared, and a portion of the medium pressure nitrogen vapor is further compressed, or methods in which the aforementioned compressor is capable of internal multistage compression, in which case the medium pressure nitrogen vapor is output from partway along the compressor, and the high pressure nitrogen vapor is output from the final stage.

In the present embodiment, an example was shown in which the fluid passage was divided into two sections, but the invention is not restricted to this configuration, and division into three or more sections is also possible.

FIG. 5 shows a system which uses plate fins for performing the vapor liquid contact within the separation and enrichment apparatus shown in FIG. 1. The passages which make up the plate fin type heat exchanger function as the aforementioned distillation passages and fluid passages, and these passages are aligned alternately, forming a dephlegmator.

In a dephlegmator 63 shown in the figure, a liquid or vapor mixture is supplied through pipelines 14, 51, 19 and 25, and distillation proceeds within a distillation passage 63a shown in FIG. 5A, and the liquid mixture passes out through the pipeline 17 and the vapor mixture passes out through the pipeline 15.

At this time, within a plate fin type fluid passage 63b shown in FIG. 5B, a heat-exchange-fluid from the pipeline 23 undergoes heat exchange with the mixture while flowing downward, and flows out from the pipeline 24.

In the dephlegmator 63 shown, because the passages are formed using plate fins, the heat exchange efficiency between the mixture and the heat-exchange-fluid can be improved.

FIG. 6 shows a system which uses plate fins for performing the vapor liquid contact within the separation and enrichment apparatus shown in FIG. 4, wherein the heat exchange passage is divided into an upper section and a lower sections of the dephlegmator.

In a dephlegmator 64 shown in the figure, a fluid passage 64b is divided into two sections, that is, an upper fluid passage 64c and a lower fluid passage 64d.

Figure 6A:
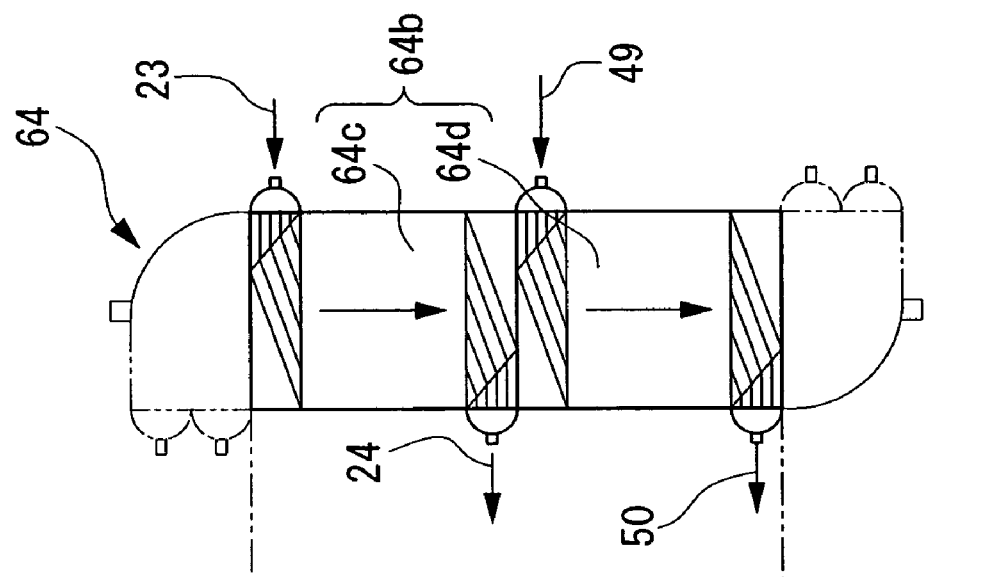
FIG. 6 is a simplified structural diagram showing a sixth embodiment of the present invention.

In the dephlegmator 64 shown in the figure, a liquid or vapor mixture is supplied through pipelines 14, 51, 19 and 25, and distillation proceeds within a distillation passage 64a shown in FIG. 6A, and the liquid mixture passes out through the pipeline 17 and the vapor mixture passes out through the pipeline 15.

Figure 6B:
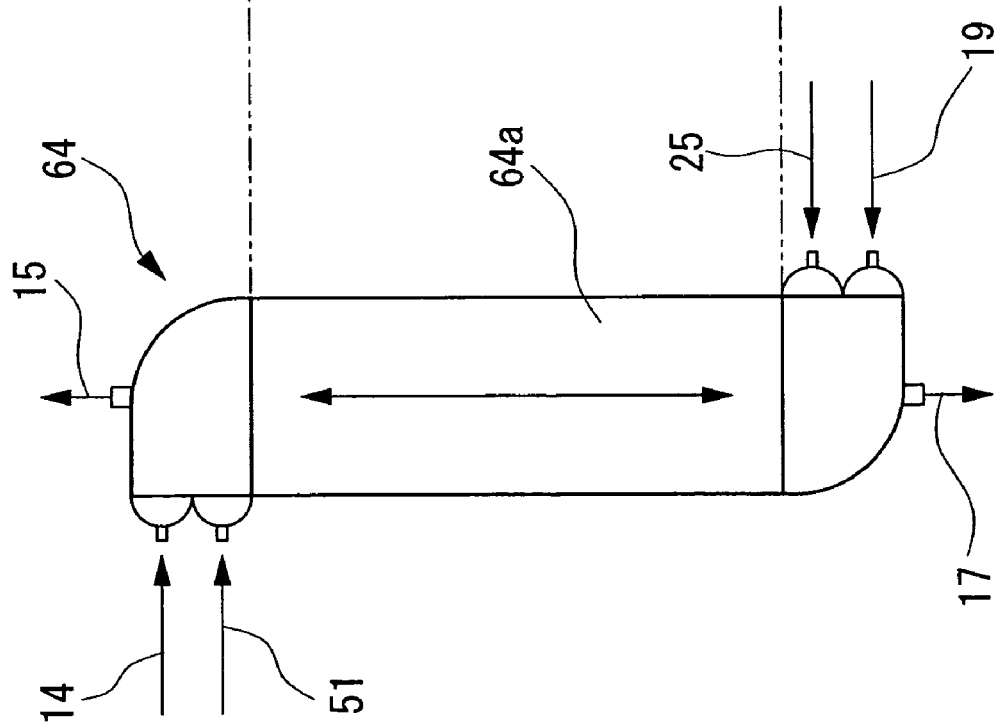

At this time, within a plate fin type fluid passage 64b shown in FIG. 6B, heat-exchange-fluids from pipelines 23 and 49 enter the upper and lower fluid passages 64c and 64d respectively, undergo heat exchange with the mixture while flowing downward, and flow out from pipelines 24 and 50 respectively.

At this time, by introducing heat-exchange-fluids of different pressures into the upper and lower fluid passages 64c and 64d, partial vaporization can be performed more gently in the upper section of the dephlegmator 64, whereas the partial vaporization in the lower section can be accelerated.

For example, a method could be adopted wherein a medium pressure nitrogen vapor is introduced into the upper fluid passage 64c through the pipeline 23 and exits through the passage 24, while a high pressure nitrogen vapor is introduced into the lower fluid passage 64d through the pipeline 49 and exits through the passage 50.

This number of fluids is not restricted to two fluids, and naturally the process could also be performed using 3 or more fluids.

EXAMPLES

The data for each column is shown in Table 3, and the results of computer simulations are shown in Table 4 and Table 5.

Figure 7:
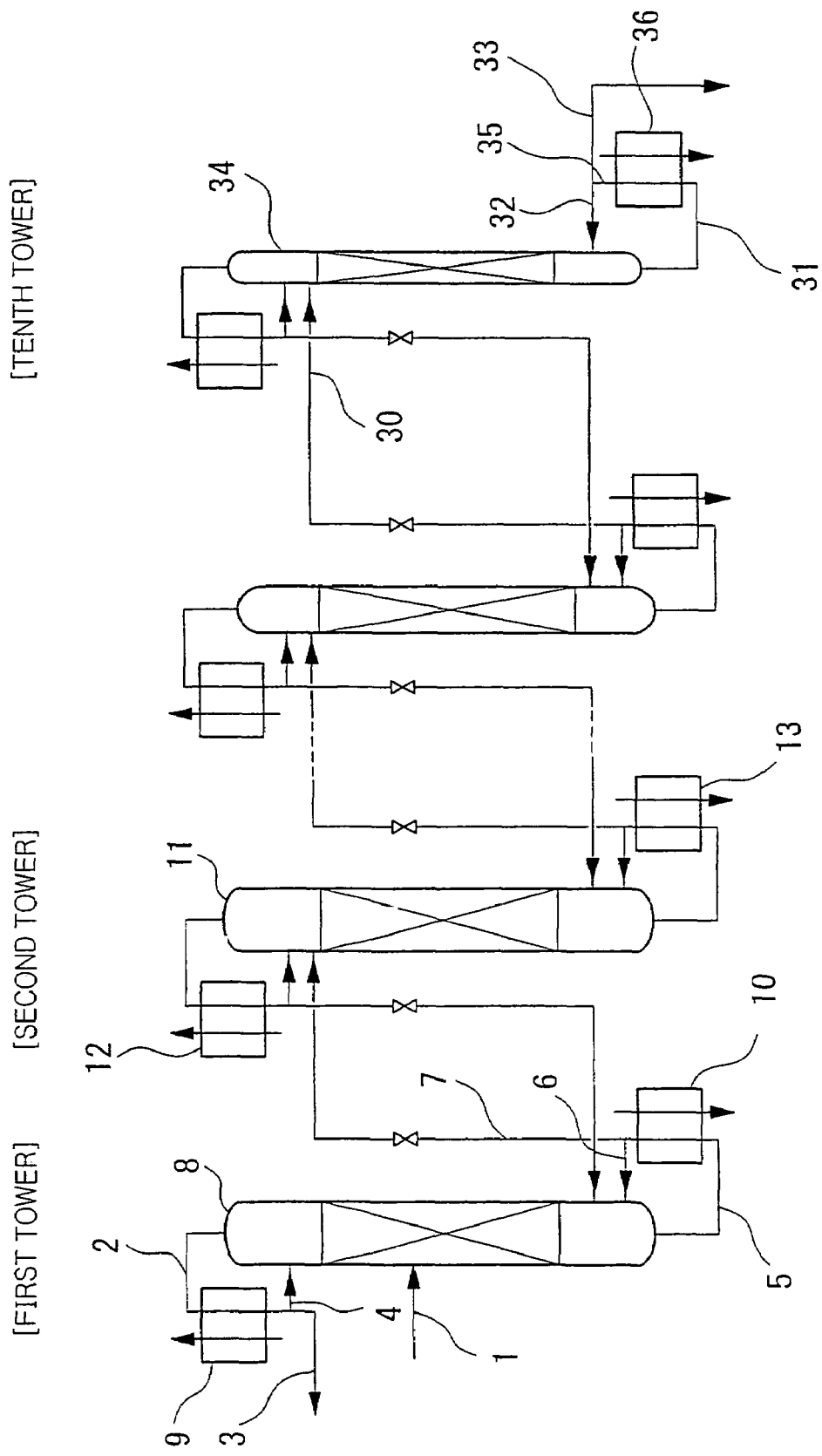
FIG. 7 is a schematic diagram showing a conventional example.
Figure 8:
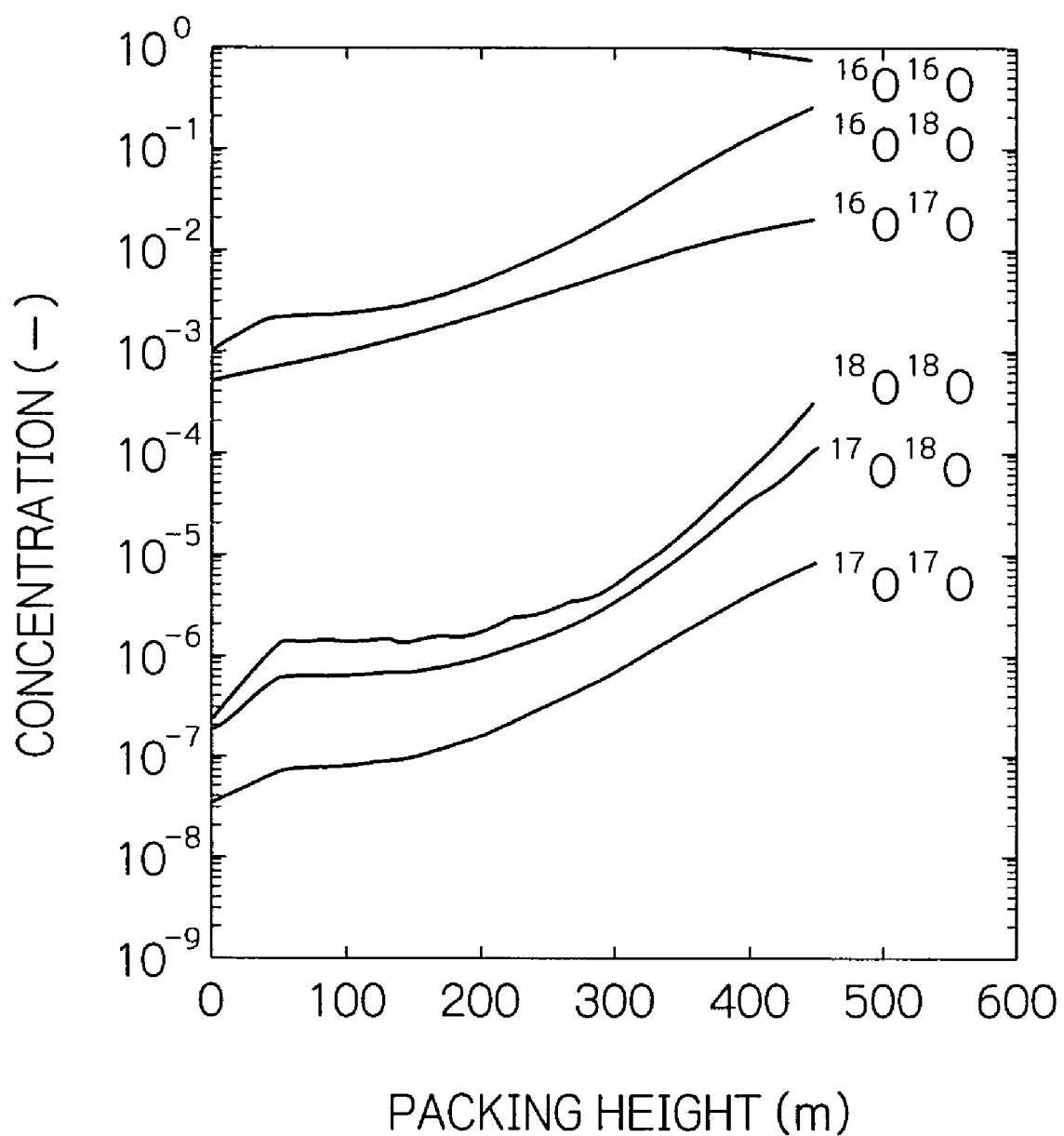
FIG. 8 is a diagram showing the enrichment distribution within columns.

Computer simulations based on the apparatus design shown in FIG. 7 for the present invention and the conventional technology, utilize a distillation theory using a rate model, or more specifically handle mass-transfer and heat-transfer simultaneously, and enable accurate prediction of mass-transfer in a multi-component-system within a dephlegmator when heat is applied or removed during distillation operation. Specific details relating to this simulation method are disclosed in Unexamined Japanese Patent Application, First Publication No. 2000-218134.

In the conventional models of H.E.T.P. (height equivalent to a theoretical plate) or equilibrium stage model, it has been not possible to predict accurately the mass-transfer in the above type of multi-component-system with simultaneous heat-transfer. Accordingly, such methods require experimental tests, needing a huge amount of test data with a large number of parameters.

TABLE 3

|  | Column 1 | Column 2 | Column 3 | Column 4 | Column 5 | Column 6 | Column 7 | Column 8 | Column 9 | Column 10 | Total |
|---|---|---|---|---|---|---|---|---|---|---|---|
| Packing height (m) | 45 | 45 | 45 | 45 | 45 | 45 | 45 | 45 | 45 | 45 | 450 |
| Packing specific surface area ($m^2/m^3$) | 500 | 500 | 500 | 500 | 500 | 500 | 500 | 500 | 500 | 500 | |
| Column inside diameter (m) | 3.00 | 3.00 | 3.00 | 3.00 | 3.00 | 2.39 | 2.12 | 1.70 | 1.09 | 0.50 | |
| Condenser exchanged heat quantity (kW) | 5531 | 6175 | 6209 | 6209 | 6208 | 3848 | 2962 | 1908 | 788 | 179 | 40018 |
| Reboiler exchanged heat quantity (kW) | 6210 | 6175 | 6209 | 6209 | 5868 | 3712 | 2895 | 1833 | 754 | 152 | 40018 |
| Column overhead pressure (bar abs) | 1.2 | 1.2 | 1.2 | 1.2 | 1.2 | 1.2 | 1.2 | 1.2 | 1.2 | 1.2 | |
| Fs (m/s $(kg/m^3)^{1/2}$) | 1.57-1.60 | 1.56-1.60 | 1.57-1.60 | 1.57-1.60 | 1.57-1.60 | 1.57-1.60 | 1.57-1.60 | 1.57-1.60 | 1.57-1.60 | 1.58-1.60 | |

TABLE 4

$^{16}O^{17}O$ Liquid holdup

|  | Column 1 | Column 2 | Column 3 | Column 4 | Column 5 | Column 6 | Column 7 | Column 8 | Column 9 | Column 10 | Total |
|---|---|---|---|---|---|---|---|---|---|---|---|
| Packing height (m) | 45 | 45 | 45 | 45 | 45 | 45 | 45 | 45 | 45 | 45 | 450 |
| Column inside diameter (m) | 3.00 | 3.00 | 3.00 | 3.00 | 3.00 | 2.39 | 2.12 | 1.70 | 1.09 | 0.50 | |
| Column overhead concentration (−) | 4.92E−04 | 7.10E−04 | 9.48E−04 | 1.34E−03 | 1.99E−03 | 3.04E−03 | 4.64E−03 | 7.14E−03 | 1.08E−02 | 1.55E−02 | |
| Column bottom concentration (−) | 7.16E−04 | 9.55E−04 | 1.35E−03 | 1.99E−03 | 3.05E−03 | 4.66E−03 | 7.16E−03 | 1.08E−02 | 1.56E−02 | 2.02E−02 | |
| (1) Holdup (kmol) | 0.9 | 1.3 | 1.8 | 2.6 | 3.9 | 3.8 | 4.6 | 4.4 | 2.7 | 0.7 | 26.6 |
| (2) Holdup (kmol) | 0.4 | 0.6 | 0.9 | 1.2 | 1.9 | 1.8 | 2.2 | 2.1 | 1.3 | 0.4 | 12.8 |
| (3) Holdup (kmol) | 0.5 | 0.8 | 1.0 | 1.5 | 2.3 | 2.2 | 2.6 | 2.6 | 1.6 | 0.4 | 15.5 |

TABLE 5

$^{16}O^{18}O$ Liquid holdup

|  | Column 1 | Column 2 | Column 3 | Column 4 | Column 5 | Column 6 | Column 7 | Column 8 | Column 9 | Column 10 | Total |
|---|---|---|---|---|---|---|---|---|---|---|---|
| Packing height (m) | 45 | 45 | 45 | 45 | 45 | 45 | 45 | 45 | 45 | 45 | 450 |
| Column inside diameter (m) | 3.00 | 3.00 | 3.00 | 3.00 | 3.00 | 2.39 | 2.12 | 1.70 | 1.09 | 0.50 | |
| Column overhead concentration (−) | 9.64E−04 | 2.06E−03 | 2.39E−03 | 2.81E−03 | 3.96E−03 | 6.96E−03 | 1.29E−02 | 2.07E−02 | 5.96E−02 | 0.1279 | |
| Column bottom concentration (−) | 2.09E−03 | 2.47E−03 | 2.90E−03 | 4.05E−03 | 7.13E−03 | 1.32E−02 | 2.74E−02 | 6.04E−02 | 0.1289 | 0.2494 | |
| (1) Holdup (kmol) | 2.4 | 3.4 | 3.9 | 5.3 | 8.7 | 10.1 | 16.1 | 22.5 | 19.9 | 8.3 | 100.8 |
| (2) Holdup (kmol) | 1.1 | 1.7 | 2.0 | 2.5 | 4.0 | 4.5 | 7.0 | 9.6 | 8.6 | 3.7 | 44.7 |
| (3) Holdup (kmol) | 1.3 | 2.1 | 2.4 | 3.1 | 4.9 | 5.6 | 8.8 | 12.2 | 10.8 | 4.6 | 55.9 |

Table 4 and Table 5 show the totals for the quantity of liquid holdup (during normal operation) for $^{16}O^{17}O$ and $^{16}O^{18}O$, which represent the target components within the distillation column.

Here, (1) Holdup represents the quantity of liquid holdup when a conventional plate fin type reboiler is used, (2) Holdup represents the quantity of liquid holdup in the case of the present invention, using a dephlegmator and omitting the reboiler, and (3) Holdup represents the quantity of holdup in another case of the present invention, using a dephlegmator and reducing the quantity of liquid holdup within the reboiler to ⅕th of the conventional quantity. In order to simplify the calculations, the calculation of each of these liquid holdup quantities assumed that the quantity of liquid holdup within the vapor liquid contact section was the same for each of (1) to (3) above. (This is an acceptable assumption for displaying the effects of the present invention.)

From Table 4 and Table 5, it is evident that for the targeted component $^{16}O^{17}O$, the length of time required for startup in the case of (1) is predicted as approximately 11 months, whereas the start-up times in the case of (2) and (3) are shortened by 52% and 42% respectively relative to (1).

Predictions of the start-up time used the formula shown below (Manson Benedict, Thomas H. Pigford and Hans Wolfgang Levi (translated by Ryohei Kiyose): Nuclear Chemical Engineering, Vol. V, Chemical Engineering of Isotope Separation, The Nikkan Kogyo Shinbun, Ltd., pp. 72-75 (1985)).

$$t_p = \frac{I(\bar{x} - z_F)}{P(y_p - z_F)} + t_w \qquad \text{Formula 1}$$

In the formula, $t_p$ is a time [s] from the commencement of an operation until the flow of a production rate reaches a fixed value, $t_w$ is a time [s] from the commencement of an operation until the flow of an exhaust vapor rate reaches a fixed value, I is a total holdup quantity [mol], P is a production rate [mol/s], $\bar{x}$ is an average molar fraction [–] of a target component, $y_p$ is a molar fraction [–] of a target component in the product, $z_F$ is a molar fraction [–] of a target component in the feed From the above results, it is evident that by using a dephlegmator, the quantity of liquid holdup in the reboiler can be reduced.

The fact that the liquid holdup quantity within the reboiler is large had been predicted (because the concentrations of the target components are high in the reboiler), and for typically used reboilers such as thermo siphon based plate fin type heat exchangers, although large amounts of actual data exist and the apparatus can be reasonably compact, it became evident that a considerably large volume of liquid is required for stable operation.

Normally, in order to ensure stable operation, the aforementioned type of thermo siphon based plate fin type heat exchanger must be at least half immersed in the liquid, and it became evident that the quantity of holdup of the vapor liquid 2 phase stream within the heat exchanger needed to be considered in addition to that external to the heat exchanger.

Furthermore, in the case of a coil type reboiler, in order to ensure the necessary heat transfer surface area, the length of the coil must be long, and in order to immerse the coil a large quantity of liquid is then needed.

Furthermore, it is evident that whether a plate fin reboiler or a coil type reboiler is used, the liquid holdup within the reboiler does not contribute to the distillation.

In the above examples, a dephlegmator need not necessarily be used for all of the reboilers, and even if the method of the present invention is applied only to those column for which the quantity of liquid holdup of the target components is large, the start-up time can still be shortened effectively, and the cost of the apparatus can also be minimized.

INDUSTRIAL APPLICABILITY

Based on the information described above, according to the present invention, by using a dephlegmator in either a portion of, or for the entire vapor liquid contact section of a distillation column, the quantity of liquid holdup within the distillation column can be reduced.

Particularly when used in the vapor liquid contact section close to a reboiler, by applying heat to the heat exchange section of the dephlegmator, distillation in the distillation section can be enhanced, while the quantity of exchanged heat of the reboiler can be reduced.

Accordingly, the reboiler can be either omitted or scaled down, and the quantity of liquid holdup can be reduced markedly.

The invention claimed is:

1. A method of separating and enriching an isotope mixture comprising at least one isotope selected from the group consisting of $^{16}O^{17}O$, $^{16}O^{18}O$, $^{17}O^{18}O$, $^{18}O^{18}O$, $^{17}O^{17}O$ using a distillation cascade, comprising the step of (a) conducting a dephlegmation, in which distillation is conducted concurrently with heat exchange between the mixture and a heat-exchange-fluid, within at least one distillation section of the distillation cascade comprising distillation columns and a dephlegmation section and the step of (b) separating said mixture of oxygen isotopes.

2. A method of separating and enriching an isotope mixture comprising at least one isotope selected from the group consisting of $^{16}O^{17}O$, $^{16}O^{18}O$, $^{17}O^{18}O$, $^{18}O^{18}O$, $^{17}O^{17}O$ using a distillation cascade comprising distillation columns and dephlegmation section, in which at least one distillation section of the distillation cascade is divided into an upper and a lower portion at an arbitrary position, comprising the steps of:

feeding a bottom liquid of the upper portion flowing out from a bottom end of the upper portion into a top end of a dephlegmation section, separating the bottom liquid into a high volatile component and a low volatile component in the dephlegmation section, feeding the high volatile component into the bottom end of the upper portion as a vapor, and feeding the low volatile component into the top end of the lower portion as a liquid enriched component and separating said mixture of oxygen isotopes.

3. A method of separating and enriching a mixture according to claim 2, wherein an entire quantity of heat that is applied to generate an ascending vapor required in said dephlegmation section is applied to said dephlegmation section.

4. A method of separating and enriching a mixture according to claim 2, wherein heat exchange in said dephlegmation section is performed by using at least two fluids of different pressure as a heating side fluid supplied to said heat exchange.

5. A method of separating and enriching a mixture according to claim 2, wherein heat-inleak is used as a heat source for applying to said dephlegmation section for heat exchange.

6. A method of separating and enriching an isotope mixture comprising at least one isotope selected from the group consisting of $^{16}O^{17}O$, $^{16}O^{18}O$, $^{17}O^{18}O$, $^{18}O^{18}O$, $^{17}O^{17}O$ using a distillation cascade comprising distillation columns and a dephlegmation section, comprising the steps of:

supplying a bottom liquid of at least one distillation section of the distillation cascade to a dephlegrnation section, and conducting a dephlegmation, in which distillation of the mixture is conducted concurrently with heat exchange between the mixture and a heat-exchange-fluid, in the dephlegmation section, in said dephlegmation section, a quantity of heat applied to generate an ascending vapor required for ensuring adequate vapor-liquid contact is the sum of a quantity of heat applied to said dephlegmation section, and a quantity of heat applied to a reboiler attached to said at least one distillation section and separating said mixture of oxygen isotopes.

7. A method of separating and enriching a mixture according to claim 6, wherein the heat-exchange fluid comprises at least two heat-exchange fluids of different pressure, and heat exchange in said dephlegmation section is performed by using said at least two heat-exchange fluids of different pressure as a heating side fluid supplied to said heat exchange.

8. A method of separating and enriching a mixture according to claim 6, wherein heat-inleak is used as a heat source for applying to said dephlegmation section for heat exchange.

9. A method of separating and enriching an isotope mixture comprising at least one isotope selected from the group consisting of $^{16}O^{17}O$, $^{16}O^{18}O$, $^{17}O^{18}O$, $^{18}O^{18}O$, $^{17}O^{17}O$ using a distillation cascade comprising distillation columns and a dephlegmation section, comprising the step of conducting a dephlegmation, in which distillation is conducted concurrently with heat exchange between the mixture and a heat-exchange-fluid, within at least one distillation section of the distillation cascade, wherein in said dephlegmation, a quantity of heat applied to generate an ascending vapor required for ensuring adequate vapor-liquid contact is the sum of a quantity of heat applied to said dephlegmation, and a quantity of heat applied to a reboiler attached to said at least one distillation section and the step of separating said mixture of oxygen isotopes.

10. An apparatus for separating and enriching an isotope mixture comprising at least one isotope selected from the group consisting of $^{16}O^{17}O$, $^{16}O^{18}O$, $^{17}O^{18}O$, $^{18}O^{18}O$, $^{17}O^{17}O$ using a distillation cascade comprising distillation columns and a dephlegmation section, comprising a plurality of distillation columns and pipes between said plurality of distillation columns, wherein at least one distillation column comprises a reboiler passage for sending a bottom liquid from said distillation column to a reboiler, a shut-off valve provided in said reboiler passage, a reboiler bypass passage for supplying said bottom liquid to a next distillation column without passing through said reboiler, and a shut-off valve provided in said reboiler passage and reboiler bypass passage, and wherein at least one distillation column is a dephlegmator which conducts distillation concurrently with heat exchange between said mixture and a heat-exchange-fluid.

11. An apparatus for separating and enriching a mixture according to claim 10, wherein a path is provided for supplying an enriched component from a lower section of said distillation column directly to an upper section of a next distillation column.

12. An apparatus for separating and enriching a mixture according to claim 10, wherein in said dephlegmator, a fluid passage through which a heat-exchange-fluid flow is divided into at least two sections in lengthwise along said fluid passage.

13. An apparatus for separating and enriching an isotope mixture comprising at least one isotope selected from the group consisting of $^{16}O^{17}O$, $^{16}O^{18}O$, $^{17}O^{18}O$, $^{18}O^{18}O$, $^{17}O^{17}O$ using a distillation cascade comprising distillation columns and a dephlegmation section, comprising a plurality of distillation columns and pipes between said plurality of distillation columns, wherein at least one distillation column comprises a reboiler passage for sending a bottom liquid from said distillation column to a reboiler, a shut-off valve provided in said reboiler passage, a reboiler bypass passage for supplying said bottom liquid to a next distillation column without passing through said reboiler, and a shut-off valve provided in said reboiler passage and reboiler bypass passage, and wherein a dephlegmator which conducts distillation concurrently with heat exchange between said mixture and a heat-exchange-fluid is provided within at least one distillation column.

14. An apparatus for separating and enriching a mixture according to claim 13, wherein a path is provided for supplying an enriched component from a lower section of said at least one distillation column directly to an upper section of a next distillation column.

* * * * *